United States Patent [19]
Rostaing et al.

[11] Patent Number: 5,965,786
[45] Date of Patent: Oct. 12, 1999

[54] PROCESS AND APPARATUS FOR THE TREATMENT OF PERFLUORINATED AND HYDROFLUOROCARBON GASES FOR THE PURPOSE OF DESTROYING THEM

[75] Inventors: Jean-Christophe Rostaing, Buc; François Coeuret, Guyancourt; Claude de Saint Etienne, Orsay, all of France; Michel Moisan, Outremont, Canada

[73] Assignee: L'Air Liquide Societe Anonyme Pour L'Etude Et L'Exploitation Des Procedes Georges Claude, Paris and Cedex 07, France

[21] Appl. No.: 08/901,399

[22] Filed: Jul. 28, 1997

[30] Foreign Application Priority Data

Jul. 26, 1996 [FR] France .................................. 96 09475

[51] Int. Cl.$^6$ ........................................................ B01J 19/08
[52] U.S. Cl. ...................... 588/210; 204/157.15; 204/164
[58] Field of Search ............................... 204/164, 157.15; 588/210, 212, 227

[56] References Cited

U.S. PATENT DOCUMENTS

| | | | |
|---|---|---|---|
| 4,883,570 | 11/1989 | Efthimion et al. | 204/164 |
| 5,300,202 | 4/1994 | Moegel | 204/157.3 |
| 5,439,568 | 8/1995 | Uchiyama | 204/164 |
| 5,750,823 | 5/1998 | Wofford et al. | 588/210 |

FOREIGN PATENT DOCUMENTS

| | | |
|---|---|---|
| 295 083 | 12/1988 | European Pat. Off. . |
| 295083 | 12/1988 | European Pat. Off. . |
| 602 510 | 6/1994 | European Pat. Off. . |
| 602510 | 6/1994 | European Pat. Off. . |
| 44 28 418 | 2/1996 | Germany . |
| 4428418 | 2/1996 | Germany . |

*Primary Examiner*—Kishor Mayekar
*Attorney, Agent, or Firm*—Burns, Doane, Swecker & Mathis, L.L.P.

[57] ABSTRACT

A process for treating perfluorinated and/or hydrofluorocarbon gases, comprising the steps of
- creating an atmospheric-pressure gas plasma in at least one hollow dielectric tube;
- making the gases to be treated flow through the at least one dielectric tube in contact with the plasma for the purpose of dissociating molecules of the gases into reactive compounds; and
- reacting the reactive compounds with a corresponding reactive element for the purpose of destroying them.

26 Claims, 6 Drawing Sheets

PROCESS AND APPARATUS FOR THE TREATMENT OF PERFLUORINATED AND HYDROFLUOROCARBON GASES FOR THE PURPOSE OF DESTROYING THEM

BACKGROUND OF THE INVENTION (i) Field of the Invention

The present invention relates to a process for the treatment of perfluorinated gases, in particular perfluorocarbons, as well as to hydrofluorocarbons, for the purpose of destroying them, as well as to a treatment apparatus implementing such a process.

The reduction of gaseous emissions caused by human activity, which are believed to be able to contribute to global warming of the climate by an increase in the greenhouse effect, is currently a major preoccupation of international proceedings. The drafting of directives and recommendations within each country, harmonized within the framework of worldwide conventions, is presently at a relatively advanced stage. The States involved could, in the relatively near future, as a next step, adopt mandatory statutory measures.

Currently, the attention of industrial concerns and governments is essentially focused on the most well-known greenhouse-gas species, namely carbon dioxide ($CO_2$), the amount of which discharged and the concentration of which in the atmosphere are by far the greatest.

However, other gases may also make an equally important contribution to possible warming of the climate, although the volumes of these which are discharged are smaller than those of $CO_2$ by several orders of magnitude. These are the perfluorinated compounds (PFC) and hydrofluorocarbon (HFC) compounds, since these gases have lifetimes in the atmosphere and absorptions in the infrared which give rise to a "global warming capability" which may be several orders of magnitude greater than that of carbon dioxide.

Thus, carbon tetrafluoride ($CF_4$) only exists in the Earth's atmosphere at an average concentration of approximately one part per million (ppmv) compared to 300 to 400 ppmv in the case of $CO_2$. However, its lifetime in the atmosphere is estimated to be approximately 50,000 years compared to 100 in the case of $CO_2$, while its absorption in the infrared is considerably higher.

The situation with regard to these gases is also special because of their widespread use in the semiconductor industry. They are used for plasma etching the patterns in integrated circuits and, above all, for cleaning, also using a plasma, thin-film deposition reactors. They are not completely consumed in these processes and give rise to residual emissions which are far from being negligible.

Compared to many other sectors, the microelectronics industry was aware very early on of the problem of gaseous-effluent reprocessing. There are several reasons for this state of affairs, one of which is the spectacularly dangerous nature of some of the substances involved—very high toxicity, highly corrosive and damaging nature with regard to the respiratory tracts, inflammability and explosiveness. It is therefore quite understandable that this industry is also the first to be concerned about limiting the discharges of perfluorinated and hydrofluorocarbon greenhouse gases which represent a potential hazard of a completely different nature, these being in general not very reactive and having a low to zero toxicity.

Furthermore, certain producers of these gases have chosen as of now to take initiatives which are restrictive vis-à-vis their customers, anticipating the predictable outcome of the official regulatory framework, for example by no longer supplying users who do not take the appropriate measures to destroy or recover a minimum amount (for example 80%) of the unreacted $C_2F_6$ emanating from process machines.

Consequently, integrated-circuit manufacturers are currently seeking to find a quick solution to the problem of reducing emissions of $C_2F_6$ and, more generally, of all the PFCs and HFCs.

The idea of an intermediate step consisting in preferably using, in processes, molecules which, among this range, have the lowest global warming capabilities is completely illusory.

This is because the choice of a molecule for a particular process, etching or reactor cleaning, is governed by its specific properties. Only very few conceivable replacements exist, especially with regard to cleaning which today is the application involving the highest consumption of active gases and for which $C_2F_6$, $C_3F_8$ and $NF_3$ appear almost uncircumventable for reasons of rapidity of the process.

It is therefore in all cases necessary to envisage either destroying or recovering the perfluorinated and hydrofluorocarbon gases which have not reacted in processes and which would otherwise be discharged into the atmosphere.

(ii) Description of the Related Art

Several solutions exist which, a priori, are conceivable for destroying PFZs and HFCs, these having reached different levels of maturity from the technical and commercial standpoint.

At the present time, only pyrolytic destruction using a burner has been achieved on an industrial scale using equipment available on the market.

In these systems, the molecule to be destroyed is thermally decomposed by means of the heat supplied by the combustion of natural gas and/or hydrogen. After decomposition, the fluorine is in the form of very reactive acidic chemical species, in particular HF, which is then very easy to destroy by reaction with an alkaline aqueous solution.

This technique is widely used at the present time. However, it has many disadvantages.

Like any process of combustion in air, it generates nitrogen oxides which are themselves harmful to the environment and which form, or will form, the subject of specific regulatory limitations with regard to their emissions. Moreover, if the combustible gas is natural gas, large quantities of $CO_2$ will be generated.

The potential of global warming of the atmosphere thus produced is very much less than that of the fluorinated gas which is destroyed. However, many authors think that this $CO_2$ emission is a dissuasive element in the dissemination of technology, in particular because the regulations regarding carbon dioxide are changing more rapidly than those regarding PFCs and HFCs.

In fact, natural gas is only used in part, or even not at all, for destroying PFC and HFC compounds since, in order to achieve high destruction yields (95 to 99%), especially in the case of the most stable compounds such as $SF_6$ and $CF_4$, it is necessary to burn hydrogen, and to do so in large quantities. Of course, this raises problems of cost and, to an even greater extent, of safety, greatly limiting the advantage to potential users.

In order to help to overcome these drawbacks, it has been envisaged to treat PFCs and HFCs by thermo-chemical decomposition over a solid, or even by pure and simple complete reaction with this solid. However, these molecules are highly stable, which singularly restricts the range of conceivable materials, and the necessary temperatures in general remain high.

The only promising results have been achieved using catalysts based on extremely expensive noble metals. More common solids capable of providing realistic destruction efficiencies, as is the case with other molecules for which satisfactory commercial systems exist, have not yet been identified.

Faced with the difficulty posed by the destruction of perfluorinated compounds and hydrofluorocarbons, it is possible to envisage another way of reducing the emissions thereof, namely the recovery of these substances after separation from the effluent mixture emitted by the process reactors. In fact, this technique is not completely concurrent with destruction. Indeed, the technological choices may be influenced by certain factors relating, for example, to regulatory constraints or to the professional practices in the country in question.

Thus, in the United States, semiconductor fabrication plants generally include a centralized system for collecting and treating the gaseous effluents, while in Japan the practice is moving more in the direction of small treatment systems close to the point of emission.

However, the known recovery technologies are profitable only in the case of large outputs and are particularly suitable for centralized approaches.

Moreover, it is presently not known how to realize destruction systems in the case of high outputs. The concepts of destruction and recovery are complementary and must be developed in parallel.

There is therefore, whatever the circumstances, a need for destruction systems which are more effective, less expensive and less restrictive than hydrogen burners.

SUMMARY AND OBJECTS OF THE INVENTION

The object of the invention is to help to overcome the drawbacks of the known processes for the treatment of PFC and HFC gases and to provide a process for the treatment of perfluorinated and hydrofluorocarbon gases, for the purpose of destroying them in order to reduce the emissions of these gases into the atmosphere, which is inexpensive and relatively easy to implement.

The subject of the invention is therefore a process for treating perfluorinated and/or hydrofluorocarbon gases, which includes the steps consisting in:

creating an atmospheric-pressure plasma in at least one hollow dielectric tube;

making said gases to be treated flow through said at least one dielectric tube in contact with said plasma for the purpose of dissociating the molecules of which said gases are composed in order to form reactive compounds, especially fluorinated compounds; and making said reactive compounds formed react with a corresponding reactive element for the purpose of destroying them.

The process according to the invention may furthermore include one or more of the following characteristics:

the step of creating the gas plasma consists in making a carrier gas flow through said dielectric tube and in exciting and ionizing said carrier gas by means of the electric field of a traveling electromagnetic surface wave moving through said carrier gas and through said dielectric tube so as to create a column of plasma which is not in local thermodynamic equilibrium;

the surface wave is produced by means of a surface-wave exciter of the surfatron-guide type;

said carrier gas consists, for example, of argon;

the perfluorinated gases are chosen in particular from $CF_4$, $C_2F_6$, $C_3F_8$, $SF_6$ and $NF_3$ and the hydrofluorocarbon gases are chosen from $CHF_3$, $CH_2F_2$, $C_2HF_5$ and $C_2H_2F_4$;

the process furthermore includes a step of mixing the gases to be treated with at least one assistant gas, prior to said step of making said gases flow through said at least one dielectric tube;

the assistant gas consists of oxygen;

said step consisting in making said reactive compounds react with said corresponding reactive element consists in making the reactive compounds react with a reactive element chosen from soda lime, water and an alkaline aqueous solution.

The subject of the invention is also an apparatus for the treatment of perfluorinated and/or hydrofluorocarbon gases, for the purpose of destroying them, for the implementation of a treatment process as defined hereinabove, which includes at least one high-frequency surface-wave exciter combined with a waveguide designed to guide the waves produced by said at least one wave exciter to at least one hollow dielectric tube supplied with a carrier gas in order to create therein an atmospheric-pressure plasma and through which said gases to be treated flow, the molecules of said perfluorinated and/or hydrofluorocarbon gases being dissociated within the plasma in order to form reactive compounds, in particular reactive fluorinated compounds, and at least one treatment unit for said reactive compounds which is arranged on the exit side of a corresponding hollow dielectric tube.

The apparatus according to the invention may furthermore include one or more of the following characteristics:

each surface-wave exciter is equipped with a cylindrical sleeve made of conductive material, inside which is mounted a corresponding dielectric tube, and includes a region for concentrating the incident waves in a space lying between the internal wall of said exciter and a free end of said sleeve for the purpose of creating therein an electric field coaxial with said tube;

said sleeve includes an inner cylinder in which said dielectric tube is mounted and an outer cylinder which, with said inner cylinder, delimits a cooling chamber supplied with a liquid coolant;

since said sleeve and said discharge tube are separated by a cylindrical space, the apparatus includes means for supplying said space with a gaseous coolant;

said hollow dielectric tube consists of the combination of two hollow dielectric tubes proper which are arranged coaxially and between which is left a cylindrical chamber supplied with carrier gas, said perfluorinated and/or hydrofluorocarbon gases flowing through the inner tube;

as a variant, the dielectric tube is made of a material insensitive to the excited fluorinated species, in particular made of a ceramic such as alumina;

the apparatus furthermore includes a silica tube coaxial with said dielectric tube and between which tubes a coolant flows;

each surface-wave exciter is provided with impedance-adjustment means which include a coaxial plunger forming a quarter-wave trap spaced apart from the wall of the outer cylindrical sleeve in which the plunger slides;

the wall of each surface-wave exciter, close to the incident-wave concentration region, is thinned down;

said at least one treatment unit for said reactive stable compounds each consist of a soda-lime cartridge;

the apparatus includes at least two high-frequency surface-wave exciters placed in series, at least two treatment units for said reactive gases, in particular reactive fluorinated gases, each arranged on the exit side of a corresponding exciter, and at least one dehydration unit inserted between said at least two exciters;

said surface-wave exciters each consist of an exciter of the surfatron-guide type.

Other features and advantages will emerge from the following description, given solely by way of example and with reference to the appended drawings.

DETAILED DESCRIPTION OF THE PREFERRED EMBODIMENTS

Figure 1:
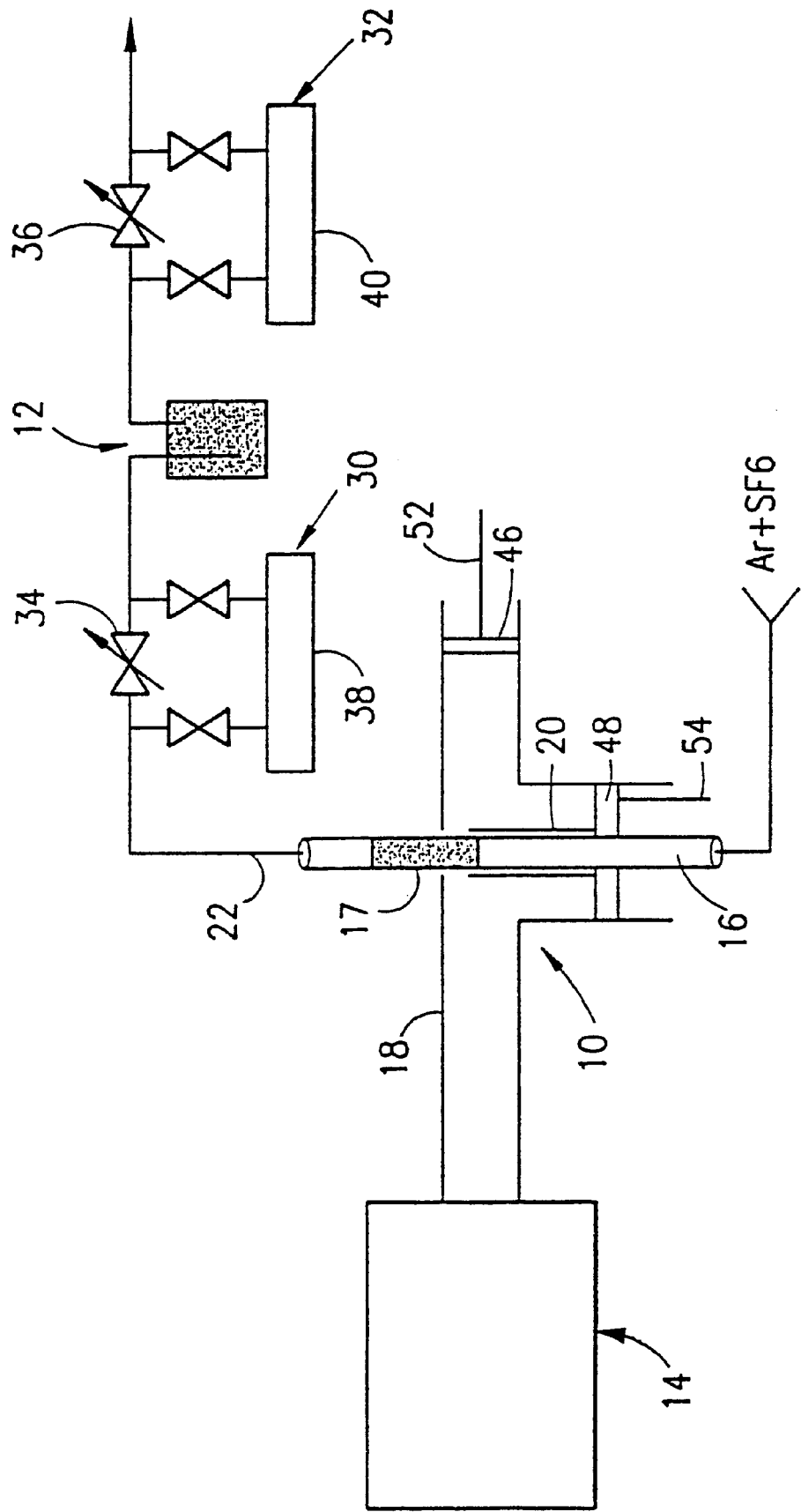
FIG. 1 is a diagrammatic view of an apparatus for the treatment of perfluorinated and hydrofluorocarbon gases according to the invention.

FIG. 1 shows diagrammatically an apparatus for the treatment of perfluorinated gases, in particular perfluorocarbon gases, as well as hydrofluorocarbons, for the purpose of destroying them.

The object of this apparatus is to place a gas to be treated in an electric field sufficiently intense to produce an electrical discharge by ionization of the gas, through the stripping of electrons from the initially neutral gas molecules.

Under the action of this discharge, the gas molecules are dissociated and form radicals, of smaller size than the initial molecules, and, consequently, individual atoms. Furthermore, new molecules or new molecular fragments are formed which have chemical properties different from those of the initial molecules.

This apparatus is intended to be mounted, for example, downstream of an integrated-circuit fabrication plant for the purpose of treating the PFCs and HFCs and, in particular, of converting these scarcely reactive gaseous effluents into reactive compounds capable of being treated using a conventional technique for the destruction of acid effluents, such as treatment in an alkaline medium, either in solution or in solid form.

In order to achieve this conversion, the apparatus according to the invention includes a high-frequency field applicator device, denoted by the numerical reference 10, consisting of a surface-wave exciter, for the purpose of generating a plasma, in order to convert the gases to be treated into corresponding reactive gases, in particular reactive fluorinated gases, and a soda-lime cartridge 12 which destroys the gases converted by the plasma-generating device 10.

The apparatus includes, associated with the high-frequency field applicator 10, a microwave generator 14, a discharge tube 16, through which the gaseous effluent to be treated and a suitable carrier gas flow and in which the plasma 17 is created, as well as a waveguide 18.

The high-frequency field applicator consists of an applicator of the surfatron-guide type which, in combination with the waveguide 18, guides the microwave radiation created by the microwave generator 14 to the discharge tube 16.

In the example in question, and as shown in FIG. 1, the carrier gas consists of argon (Ar) and the gaseous effluent to be treated is $SF_6$.

FIG. 1 also shows that the discharge tube 16 is arranged in a sleeve 20, made of conductive material, the structure of which will be described in detail with reference to FIG. 2. It is connected downstream, with respect to the direction of flow of the gases, outside the field applicator 18, to a line 22 for conveying the converted gases to the cartridge 12.

FIG. 1 also shows that the line 22 includes two branch-off units 30 and 32 which are controlled by corresponding valves 34 and 36 and on which are mounted, in a sealed manner, sampling cells 38 and 40 for the purpose of analyzing the gases using Fourier transform infrared spectrometry.

These cells are "SPECTRA-TEC" single-passage-type cells having a length of approximately 100 mm, giving a detection limit which is amply sufficient for the envisaged application.

It should be pointed out that the line 22 is made entirely of Teflon® PFA, a polymer extremely resistant to corrosive substances. This is because the lifetime of metallic components, including stainless steel of the 316L type, is very short under the envisaged conditions of use.

The assembly consisting of the waveguide 18 and the discharge tube 16 will now be described with reference to FIGS. 2 and 3.

As mentioned previously, the waveguide 18 is associated with the surfatron-guide applicator 10.

Figure 2:
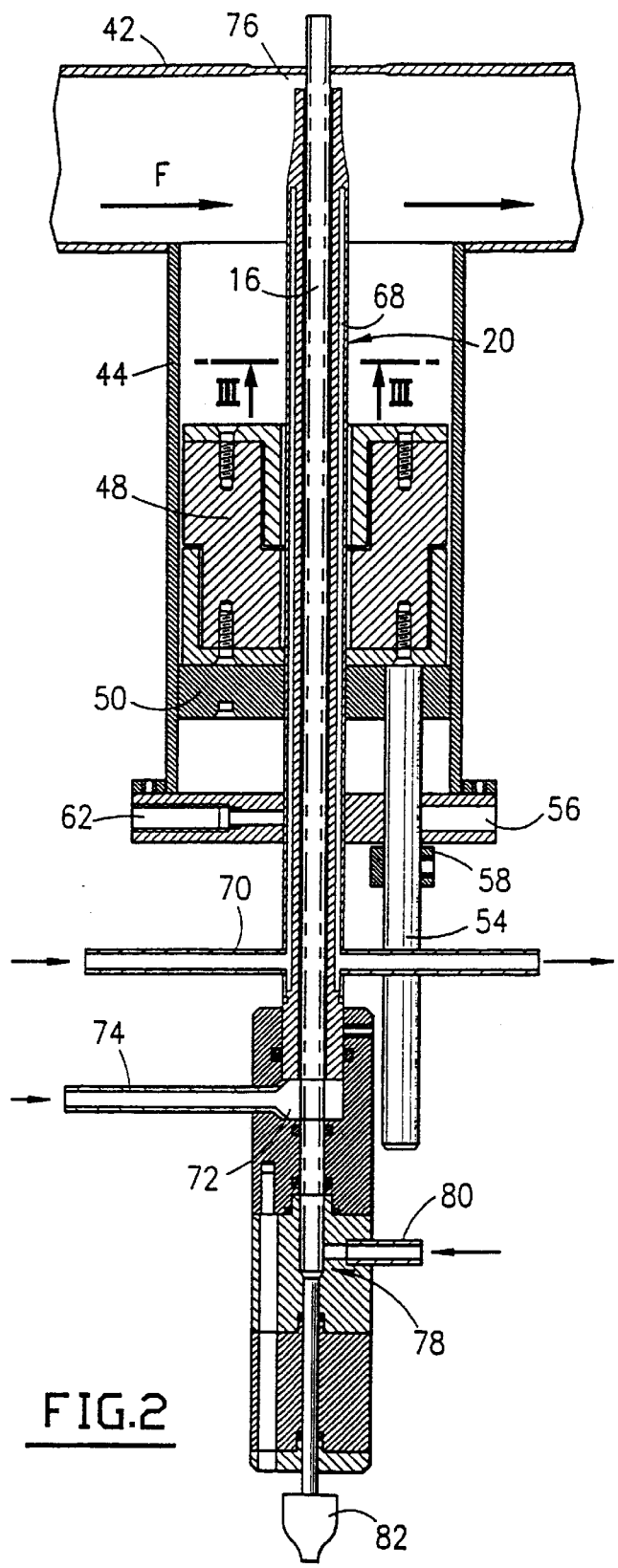
FIG. 2 is a longitudinal sectional view of a plasma exciter and of the associated treatment reactor.

The surfatron-guide 10 includes a first part 42, forming a waveguide proper and intended for propagating the microwave radiation which is guided by the waveguide 18 and incident in the direction denoted by the arrow F in FIG. 2, and an impedance-matching second part composed of two elements, a first element 44, coaxial with the discharge tube 16 and called hereafter the coaxial part, and the waveguide plunger 46 shown in FIG. 1.

Moreover, the coaxial part 44 is in the form of a cylinder in which is mounted, so as to be able to move axially, a tuning plunger 48 coaxial with the discharge tube 16 and forming a quarter-wave trap. The plunger is fixed to a sliding washer 50 advantageously made of Teflon®.

The surfatron-guide 10 is furthermore provided with means for controlling the adjustment of the axial position of the plungers 46 and 48, these means consisting of rods 52 and 54 which can be operated manually by a user for the purpose of impedance-matching the microwave-generator/waveguide system to the surfatron-guide/plasma system by moving the tuning plunger 48 and the short-circuiting plunger 46.

It should be pointed out that the coaxial plunger 48 provides contactless short-circuiting by means of a quarter-wavelength trap allowing high-performance operation as well as virtually no maintenance.

Furthermore, a screw 56 is provided in the body of the coaxial part 44 for the purpose of locking the tuning plunger 48 in position after having carried out the adjustment.

It may furthermore be seen in FIG. 2 that an adjustable stop 58 for limiting the movement of the tuning plunger 48 is provided on the corresponding control rod 54 for the purpose of presetting the tuning.

As mentioned previously, the discharge tube 16 is arranged in the sleeve 20 and is mounted so as to be able to move axially with respect to the coaxial part 44 and to the tuning plunger 48. The body of the coaxial part 44 furthermore includes a device for holding the sleeve 20 in position, consisting of a transverse screw 62.

Figure 3:
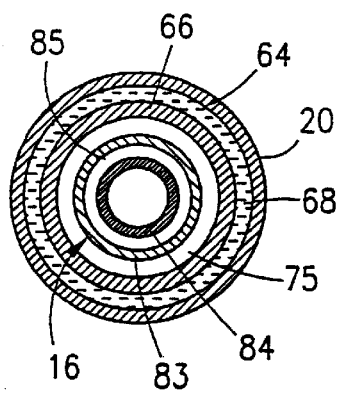
FIG. 3 is a cross section on the line III—III of one element of the reactor in FIG. 2.

Referring in particular to FIG. 3, it can be seen that the sleeve 20 has two coaxial walls 64 and 66 which between them delimit a cylindrical chamber 68 which is in communication with a water-cooling circuit 70, shown partially in FIG. 2.

It may be imagined that, in operation, water flows between the inner wall 66 and the outer wall 64 and thus cools the sleeve 20.

Moreover, the sleeve 20 is connected, by means of a suitable connecting flange 72, to a compressed-air supply line 74 for the purpose of causing a flow of forced air through the gap 75 between the discharge tube 16 and the inner wall 66 of the conductive sleeve 20 in order to cause additional cooling.

This is necessary when operating at atmospheric pressure, at which pressure the gas in the plasma reaches temperatures markedly less than those of the electrons but which are nevertheless likely, in the absence of cooling, to cause the discharge tube 16 to melt.

It may be seen in FIG. 2 that a free end of the sleeve 20 emerges in the waveguide 42 and, with the inner wall of the latter, delimits a gap 76 by means of which the microwave energy localized at this point is transmitted to the plasma via a surface wave.

It should be pointed out that the cross section of the wall of the surfatron-guide 18 close to the gap 76 is thinned down to a thickness of between 0.5 and 0.7 mm by removing material from the outer wall of the waveguide 42 so as not to interfere with excitation of the surface waves, without which significant losses of microwave power would occur through heating in the structure making up the wall of the waveguide 42.

It should also be pointed out that the gap 76 can be adjusted by moving the sleeve 20 axially in the coaxial part 44 and by locking it using the screw 62. This adjustment makes it possible to optimize the impedance matching, preventing the formation of an electric arc in the gap 76 when the apparatus is operating at high microwave power.

Moreover, it may be seen in FIG. 2 that the discharge tube 16 is connected, by means of a suitable fitting 78, to a pipe 80 for supplying the carrier gas, consisting, as mentioned previously, of argon, for the purpose of injecting it into the annulus-shaped tube, and the function of which will be described in detail later.

Finally, it may be seen in this figure that a free end of the discharge tube 16 is connected to a fitting 82, shown diagrammatically, for the purpose of connecting the discharge tube 16 to a source, not shown, for supplying the gas mixture to be treated.

It should be noted that the discharge tube is made of a dielectric material. According to a first embodiment, this tube 16 consists of a hollow silica tube 83 having an external diameter equal, for example, to 8 mm and an internal diameter equal, for example, to 6 mm.

It may be imagined that the construction of the surfatron-guide and of the discharge tube makes it possible to concentrate the microwave radiation produced by the generator 14 in the gap 76 so as to propagate, in the discharge tube 83 (FIG. 3) and in the ionized gas mixture which it contains, a traveling electromagnetic surface wave whose associated electric field maintains a discharge in the gas mixture. This construction therefore allows the electric field of the incident wave to be communicated to the plasma in the axial direction of the discharge tube 16 through the gap 76.

The plasma thus generated is in the form of a column and its electron density decreases on going away from the gap according to a known function.

The diameter of the discharge tube 16 is chosen to be small enough to obtain a single plasma filament which is centered on the axis of the tube and which can be established in a stable and reproducible manner. This is because, when operating at atmospheric pressure, in the case of sufficiently large diameters, the diameter of the plasma itself would not increase and the gaseous effluent to be treated which is flowing at the periphery would be subjected to an increasingly weak interaction with the active species in the plasma. Furthermore, several plasma filaments could form, exhibiting erratic behavior and with the possibility of sticking against the wall of the discharge tube, which would damage it.

It should be noted that, in order to increase the permissible flow rates, it is possible to combine several small-diameter discharge tubes in parallel or to mount several microwave applicators in series on a single tube.

The arrangement which has just been described makes it possible to create, in the path of the gaseous effluent to be treated, a plasma which is the site of very high electron-energy excitations, corresponding to temperatures of several tens of thousand kelvin, thus allowing, by electron collision, conversion of the gaseous effluent molecules from a chemically quite inert state to a reactive state with a high yield.

It should be noted that the plasma created by this apparatus is a plasma not in local thermodynamic equilibrium (LTE).

In this type of plasma, only the electrons present in the medium are raised to high energies, the temperatures of the ionic and neutral species remaining much lower, in fact often quite close to ambient temperature. In a system which is not in thermodynamic equilibrium, many states may be attained by varying the discharge parameters, for example the frequency of the electromagnetic field, the diameter of the discharge tube and the composition of the gas mixture to be treated by adding assistant gases thereto.

On the other hand, if we consider the case of plasmas in local thermodynamic equilibrium (LTE), in which all the species are at the same very high temperature (of the order of several tens of thousand K), the total reaction balance is not always favorable for accomplishing a particular chemical conversion process.

As in any system in local thermodynamic equilibrium, the final state of the conversion is essentially determined by the temperature of the system. Undesirable reaction pathways may be favored, just as well as the elementary conversions of use to the desired result. In addition, the very high enthalpy of the medium leads to constraints in the factory layout (cooling, etc.) besides the fact that maintaining this enthalpy is very costly in terms of energy.

It may therefore be imagined that the discharges produced not in local thermodynamic equilibrium are both energetically more effective and offer the possibility of finding even more optimized operating conditions for carrying out the conversion of the envisaged molecules.

The very high-energy excitation levels which certain fluorinated species attain in the discharge can make them particularly aggressive chemically with respect to the discharge tube, possibly leading to the wall of the latter being punctured in a few minutes.

In order to solve the problem of the discharge tube being attacked, FIG. 3 shows a configuration in which this tube includes two coaxial silica tubes, namely an outer first hollow tube 83, the discharge tube proper, having an external diameter equal, for example, to 8 mm and an internal diameter equal, for example, to 6 mm and an inner hollow tube 84, of small diameters, the external diameter being equal, for example, to 4 mm and the internal diameter being equal, for example, to 2 mm, making it possible to inject the gas mixture to be treated into the discharge zone.

These tubes delimit a cylindrical chamber 85 allowing injection of argon, via the fitting 78, around the inner tube 84, thus creating a sheath around the reactive gas for the purpose of reducing the amount of corrosive species which can strike the wall of the surface-wave tube.

The inner tube 84 serves only to inject the gas mixture to be treated into the discharge zone, lies entirely outside the latter, supports the propagation of no electromagnetic surface wave and plays no part in maintaining the plasma, as otherwise it too would be very rapidly damaged.

More specifically, its downstream end does not go beyond that of the conductive inner sleeve 20 and no portion of this tube lies in the gap.

Various experimental results will now be presented, with reference to FIGS. 4 to 7.

First of all, the destruction of $SF_6$ will be described with reference to FIGS. 4 and 5.

These figures are infrared absorbance spectra as a function of the wavenumber of the treated gas sampled respectively as it leaves the discharge tube 16 and as it leaves the soda-lime cartridge 12.

The gaseous effluent to be treated consists of $SF_6$ with a flow rate of 50 sccm (standard $cm^3$ per minute) with an argon dilution of 300 sccm, the incident microwave power being fixed at 300 W.

Beforehand, and as mentioned previously, the impedance-matching adjustment of the plasma generator 10 is carried out by varying the width of the gap 76, the position of the coaxial tuning plunger 48 and the position of the waveguide short-circuiting plunger 46.

It should be noted that only the two latter adjustments, namely the adjustment of the tuning plunger 48 and of the short-circuiting plunger 46, may be made in real time, since the plasma has been turned on, using the maneuvering rods 52 and 54.

Moreover, the gap 76 can only be adjusted by successive approximations, the modifications being made without turning the plasma on in order not to expose the operator to leakage radiation incompatible with the safety standards. Having completed the tuning, a reflected power of only a few watts is obtained.

In operation, it may be noted that the argon sheath 85 is very effective at reducing the rate at which the discharge tube 16 is attacked.

Figure 4:
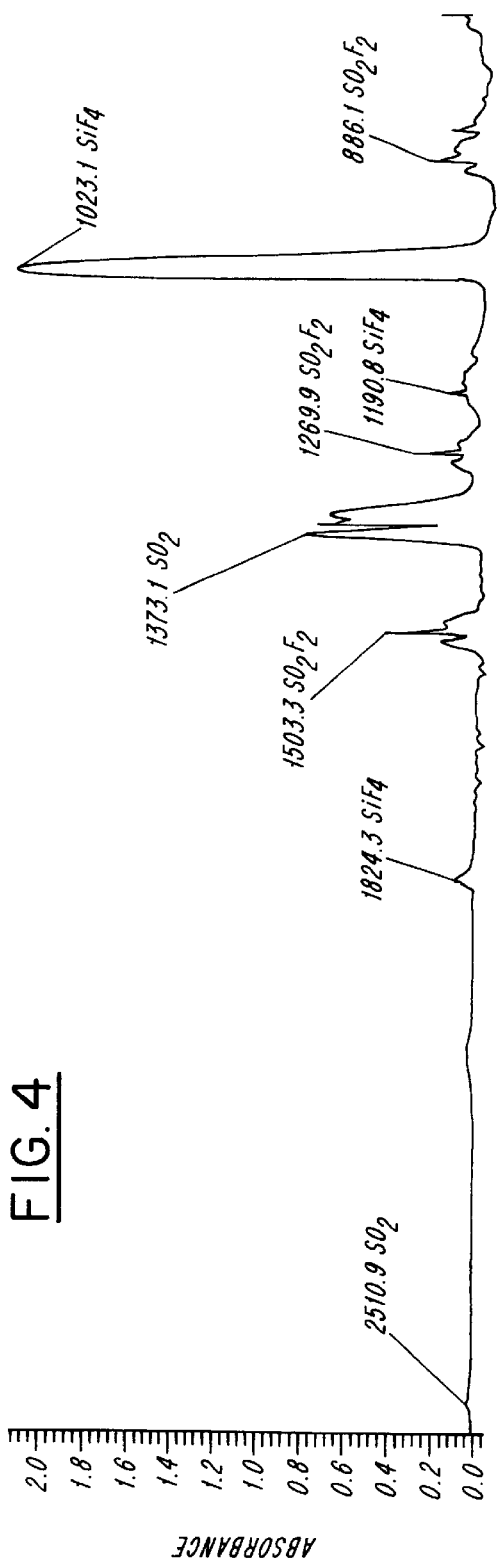
FIG. 4 is an infrared spectrum of a gas mixture as it leaves the dielectric tube, showing the decomposition of $SF_6$.

Referring to FIG. 4, the discharge having been established, analysis upstream of the cartridge 12 shows an absence of peaks corresponding to $SF_6$ while absorption lines characteristic of products formed by the reactions in the discharge appear, from which lines may be identified, for example, $SO_2$ at 2510.9 $cm^{-1}$ and 1373.1 $cm^{-1}$, $SO_2F_2$ at 1503.3 $cm^{-1}$, 1269.9 $cm^{-1}$ and 886.1 $cm^{-1}$ and $SiF_4$ at 1824.3 $cm^{-1}$, 1190.8 $cm^{-1}$ and 1023.1 $cm^{-1}$, attack of the silica tube playing a major role in the generation of these products. All these products are distinguished by their greater or lesser acidic character.

Figure 5:
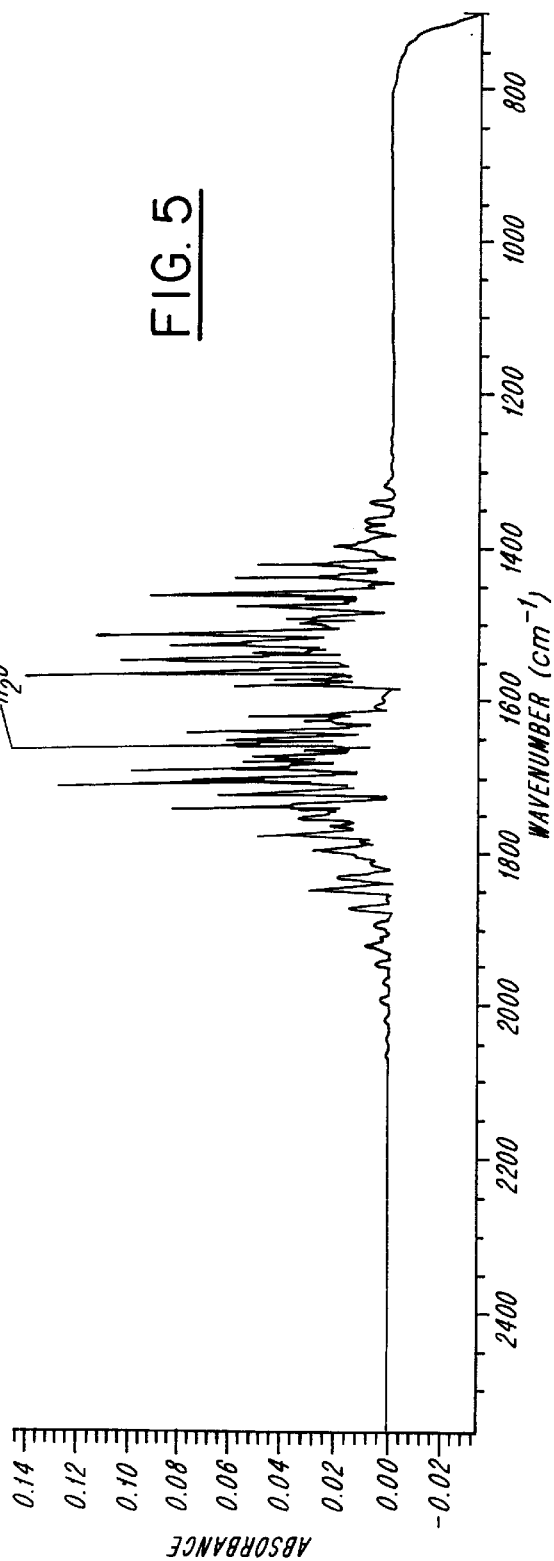
FIG. 5 is an infrared spectrum of the gas mixture in FIG. 4 as it leaves the soda-lime cartridge, showing the residual composition after treatment.

FIG. 5 shows that, downstream of the soda-lime cartridge 12, only bands corresponding to water vapor remain, which may be explained by the fact that, on the one hand, the soda lime normally has quite a high degree of moisture, which is moreover necessary for it to be effective in the reaction with the fluorinated reactive species, and, on the other hand, the treatment line finally emerges in the open air. It should also be noted that a very small $SF_6$ peak appears at 947 $cm^{-1}$ in the transient state, this being due to the desorption of $SF_6$ which was previously absorbed by the internal surface of the line 22. This peak rapidly disappears in the steady state.

It may therefore be noted that the desired result, namely the complete disappearance of $SF_6$ is achieved after the treatment.

Thus, such an apparatus mounted downstream of an integrated-circuit fabrication reactor ensures that the gaseous effluents are virtually completely destroyed and also that the conversion products are discharged into the atmosphere at levels below the limits imposed by regulations or established by practice in the microelectronics industry.

Figure 6:
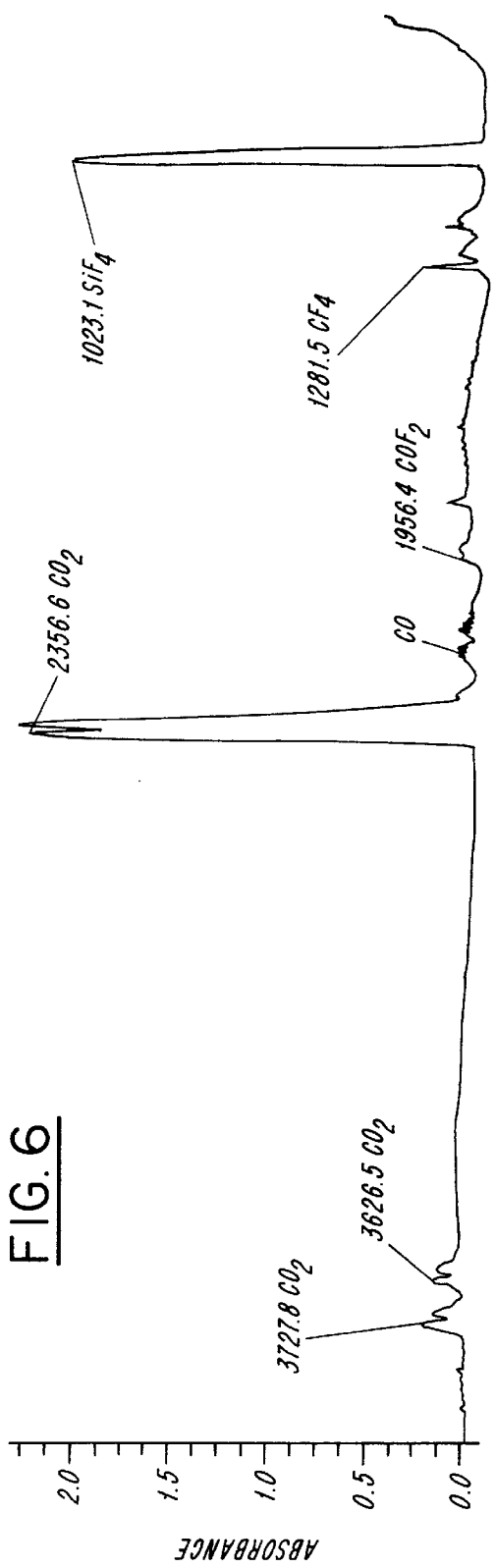
FIG. 6 is an infrared spectrum of a gas mixture as it leaves the dielectric tube, showing the decomposition of $C_2F_6$.
Figure 7:
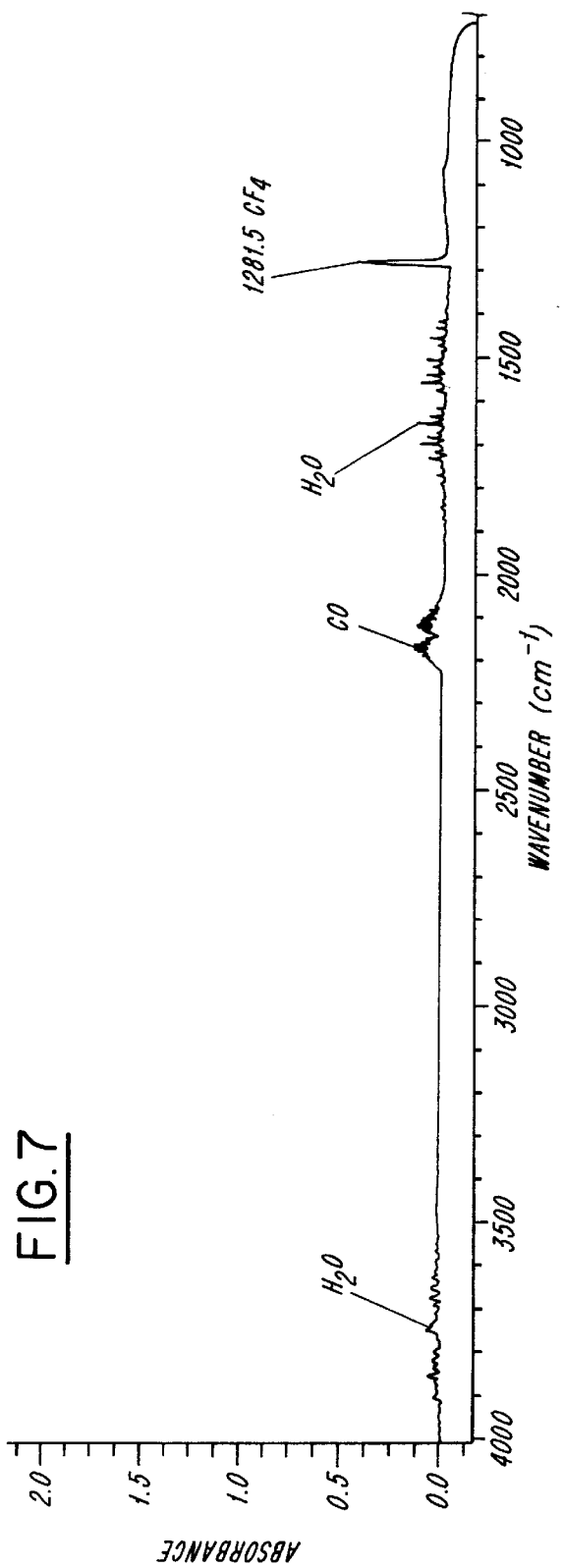
FIG. 7 is an infrared spectrum of the gas mixture in FIG. 6 as it leaves the soda-lime cartridge, showing the residual composition after treatment.

Referring to FIGS. 6 and 7, it may be seen that the same treatment technology may be applied to $C_2F_6$, the molecules of which presently are of greatest commercial interest for the plasma cleaning of thin-film deposition reactors, since it is easier to dissociate it in the radiofrequency discharges used in this case, which results in a markedly greater concentration of active species in the discharge, hence a substantially increased rate of attack.

In the case of this molecule however, there exists a priori a difficulty due to possible deposition of a thin solid film of amorphous carbon on the inner wall of the discharge tube 16. This amorphous carbon film would necessarily have a dielectric function different from that of silica (in fact, it would be quite a good conductor compared to the latter) and its presence would therefore modify the wave-propagation conditions, thereby disturbing the plasma and possibly extinguishing it.

It would still be possible to inject, into the gaseous effluents, additional gases capable of attacking the amorphous carbon and of cleaning the tube continuously, but this would restrict the possibilities of optimization of the conversion processes in the gas phase (in fact, it should in any case be pointed out that $C_2F_6$ is always associated with $O_2$ in the reactor-cleaning processes, which could very well prove to be sufficient).

Preliminary tests show that destruction of a large fraction of the $C_2F_6$ flow requires a higher incident microwave power to be applied than for the same flow of $SF_6$. More specifically, there is quite a high probability of $C_2F_6$ being converted into $CF_4$, which is at least as difficult as $SF_6$ to dissociate.

However, it should be noted that, even without the addition of $O_2$ ($C_2F_6$+Ar only), it seems that there is no carbon deposit of any kind produced on the tube and that the plasma is not disturbed during the treatment. However, the attack on the wall of the silica tube by the fluorinated species may constitute a non-negligible source of oxygen.

The treatment of $C_2F_6$ was carried out with an incident microwave power of 400 W and incident flow rates of 300 sccm of Ar in the outer tube 83 and of 100 sccm of Ar, 50 sccm of assistant gas, consisting of $O_2$, and 50 sccm of $C_2F_6$ in the central inner tube 84.

Having established the discharge, the infrared spectrum in FIG. 6 is obtained on leaving the plasma. No peaks corresponding to $C_2F_6$ can be seen, but a low concentration of $CF_4$ has been produced. The other conversion products identified are $CO_2$, $COF_2$, $SiF_4$ and CO, which are for the most part known to react with wet soda lime, apart from CO.

After the cartridge, the infrared analysis spectrum (FIG. 7) shows that the residual amounts of $SiF_4$ and $COF_2$ are very probably below the TLV (Threshold Limit Value). There is in fact no detectable signal. On the other hand, it would be necessary to measure the concentration of CO in order to check that it is well below the TLV (Threshold Limit Value) for this molecule (50 ppm).

The production of $CF_4$ in the system introduces a degree of ambiguity in the definition of destruction effectiveness. This is because it should be noted that this compound is deemed to be nontoxic and does not have a TLV (Threshold Limit Value). There may therefore be no statutory absolute limit to the concentrations discharged. Moreover, the discharge standards under preparation for greenhouse gases refer to a relative reduction (e.g., 80% of the initial concentrations). There is no $CF_4$ in the effluents to be treated. It will be seen, however, that the final concentration of $CF_4$ seems quite low compared to the initial concentration of $C_2F_6$.

However, increasing the flow rate of oxygen to 100 sccm has shown that the reactions in the discharge no longer produce $CF_4$ generally. It may therefore be stated that, in terms of destruction effectiveness, the results are also very positive in the case of $C_2F_6$. On the other hand, the problem of the attack on the discharge tube 16 is more acute because, inter alia, of the increase in the microwave power density in the discharge.

In order to help to overcome this drawback, it is possible to make the discharge tube from a material which is markedly less liable to be attacked by the excited fluorinated species, for example a tube made of ceramic, such as alumina. It is readily checked that an alumina tube immersed in an aqueous solution of hydrofluoric acid undergoes substantially no degradation. However, this material has a drawback because of its very high sensitivity to the thermal shocks occurring when igniting and extinguishing the plasma.

However, the effect of these thermal shocks may be moderated by providing cooling, by circulating a fluid around the periphery of the discharge tube. An outer concentric tube made of silica provides the confinement of the coolant, which flows through the cylindrical space formed between the two tubes. The coolant is in particular water.

Figure 8:
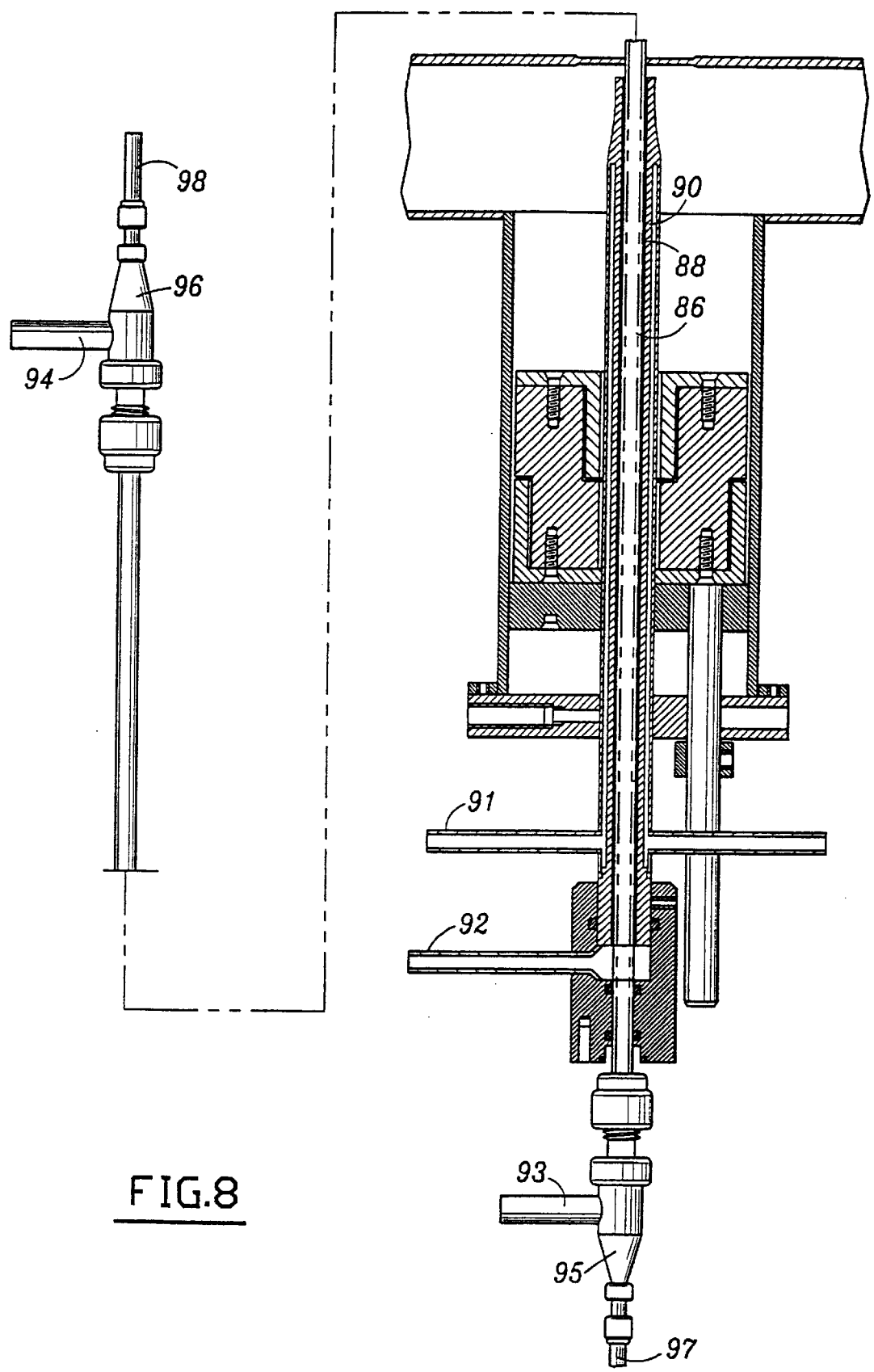
FIG. 8 is a longitudinal sectional view of a plasma-generating reactor according to another embodiment.

FIG. 8 shows a discharge tube 86 produced as described above.

This figure shows the ceramic discharge tube 86 surrounded by the silica outer tube 88, these two tubes being placed in a sleeve 90, similar to the sleeve described previously.

This figure also shows that, as in the previous illustrative embodiment, the sleeve 90 is connected to a cooling circuit 91, shown partially.

Likewise, a gaseous coolant delivered via a corresponding supply pipe 92 is also made to flow in the space lying between the sleeve 90 and the silica tube 88. However, this gas cooling is optional here because of the presence of the water-cooling of the discharge tube, the latter cooling being in general significantly more effective than the former type of cooling.

The cooling water flows through the space lying between the discharge tube 86 and the outer silica tube 88, between an inlet nozzle 93 and an outlet nozzle 94. If town water is used in an open circuit, the inlet pressure is that of the mains and the water extracted from the outlet nozzle 94 is discharged into the drains.

On the other hand, if closed-circuit cooling is used, this includes, on the outside of the discharge tube, suitable continuous pumping and cooling devices, these not being shown.

Fittings 95 and 96 are designed, as may be seen, so as to provide sealing of the inter-tube space, through which the cooling water flows, with respect to the ambient medium.

Furthermore, the carrier gas and the gases to be treated are delivered simultaneously by means of a supply pipe connected to the upstream end 97 of the discharge tube 86 via a suitable fitting, not shown.

Next, the treated gases are delivered to a treatment unit similar to that described above via a line connected to the downstream end 98 of the discharge tube 86 via a suitable fitting, not shown.

It should be noted that this water cooling is only of advantage in the case of an atmospheric-pressure surface-wave plasma. This is because, in this case, the very dense plasma generated takes an appreciable portion of the energy delivered by the microwaves, while this energy would in practice serve only to heat the water in the case of a less dense plasma maintained at low pressure.

However, it is necessary, even in the first case, to reduce the thickness of the layer of cooling water as much as possible so as to minimize the electromagnetic energy losses in this layer.

Satisfactory results have been obtained using an alumina tube having an external diameter of 5 mm and an internal diameter of 4 mm, with a $C_2F_6$ flow rate equal to 25 sccm, an $O_2$ flow rate equal to 30 sccm and an argon flow rate equal to 500 sccm. With a microwave power equal to 900 W, not only is no $C_2F_6$ peak able to be observed but the $CF_4$ peaks have also virtually disappeared.

However, the various experiments which have been carried out using this apparatus have demonstrated that there is a certain saturation in the permissible flow rates which is about 50 to 70 sccm (standard $cm^3$/min), this being insufficient for many applications.

It has in fact been found that, above a certain microwave power delivered by the generator to the surfatron-guide applicator, the fraction of the incoming gas ($SF_6$, $C_2F_6$, etc.) dissociated hardly increases anymore. In this case, the additional microwave energy seems to be used merely to excite the dissociation products to higher levels and no longer to decompose the molecules of the incoming gas further.

Figure 9:
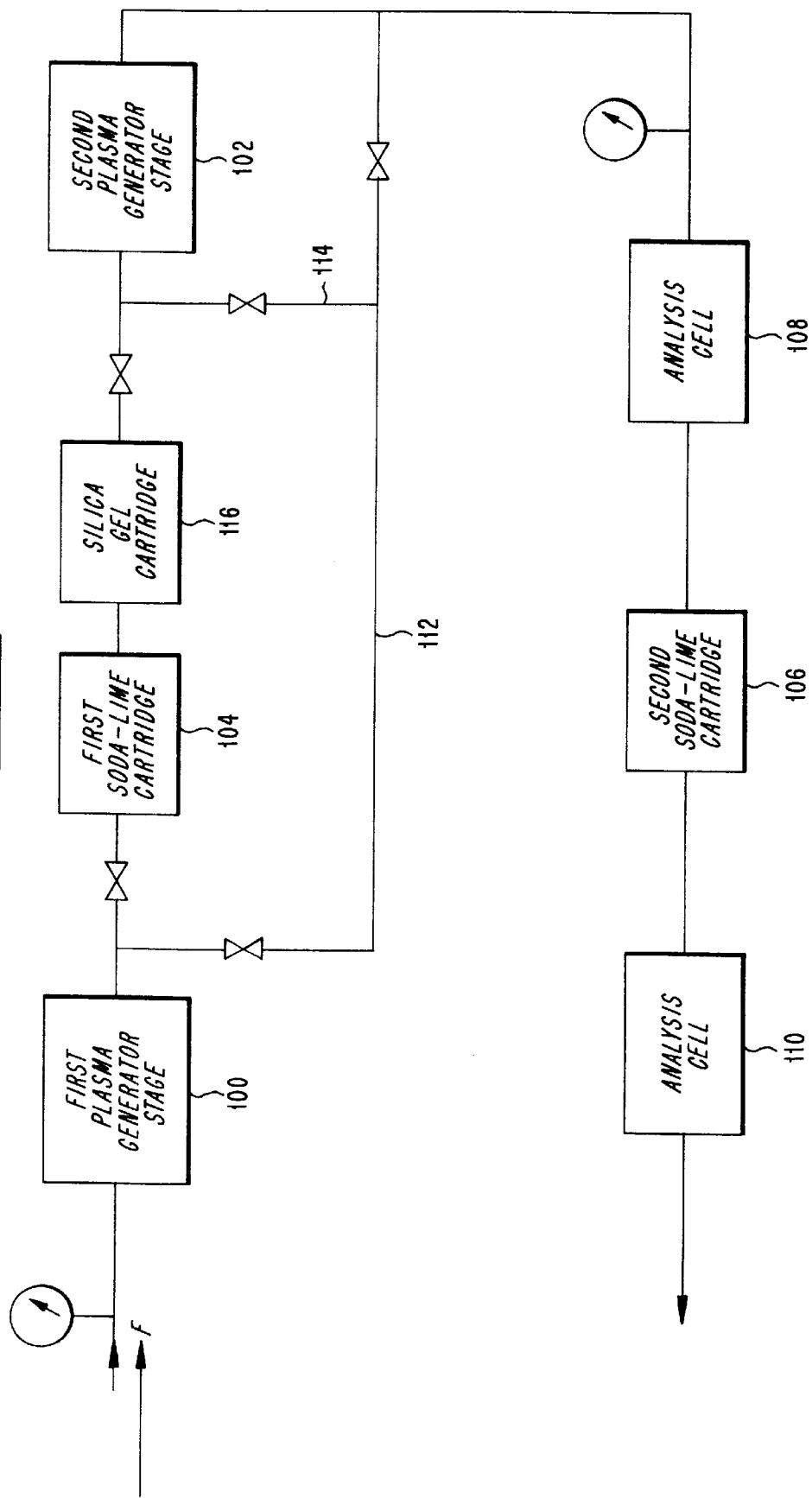
FIG. 9 shows an apparatus for the treatment of perfluorinated and hydrofluorocarbon gases according to another embodiment.

FIG. 9 shows an apparatus enabling this draw-back to be overcome, in which two plasma generator stages 100 and 102, each associated with a corresponding discharge tube, are arranged in series.

These stages 100 and 102 are identical to those described above with reference to FIGS. 1 to 3 and they will therefore not be described again below.

The line in which the gaseous effluents under treatment flow, described with reference to FIG. 1, has been modified for this apparatus so as to make the flow of gaseous effluent to be treated pass, in the direction of the arrow F, through the first plasma generator stage 100, then through a first soda-lime cartridge 104, then to the second plasma generator stage 102 and finally to a second soda-lime cartridge 106.

As a result, the first soda-lime cartridge removes from the gas flow to be treated all the dissociated and/or reactive species produced by the first plasma, so that only that fraction of the gas to be treated which has not reacted in the first plasma is introduced into the second.

Moreover, analysis cells 108 and 110, identical to the cells described previously with reference to FIG. 1, are placed on each side of the second soda-lime cartridge 106.

Furthermore, two branch-off lines 112 and 114 enable the gas flows to be analyzed after passing through the first plasma generator stage 100 and after the first soda-lime cartridge 104.

When it is attempted to operate the two plasmas simultaneously, using a $C_2F_6/O_2/Ar$ mixture similar to that used in the experiment described with reference to FIGS. 6 and 7, it appears that the operation of the second discharge is extremely disturbed and is in fact interrupted after a few seconds. It is natural to assume that this is due to the presence of the soda-lime cartridge 104 located upstream of this second plasma. The soda lime may introduce elements into the gas stream which are likely to quench the downstream plasma.

First of all, the granules of commercial soda lime are well-known for producing large amounts of very small solid particles not visible to the naked eye. The spectacular effect of these particles on the behavior of the discharges is well known. In particular, these particles act as very effective electron traps and therefore oppose very strongly the maintenance of plasmas.

Moreover, in order effectively to react with the acid gas effluents, the soda lime must be slightly wet. The neutralization reaction produced in the soda lime produces a surplus of large quantities of water. When water vapor is introduced into the second plasma generator 102, its dissociation creates large concentrations of hydrogen which also tend to attenuate the plasma strongly. It is in fact well known that it is more difficult to maintain a microwave discharge in hydrogen than in argon.

In order to help to overcome this drawback, means for retaining the particles and the water are inserted between the first soda-lime cartridge 104 and the second plasma generator stage 102, these means consisting, for example, of a cartridge 116 of silica gel, very effective for dehydrating the gas stream, and which also seems to stop most of the particles. If this were not the case, a particle filter could also be used.

By operating this apparatus with a microwave power, in the case of the first stage 100, equal to 1100 W and a microwave power, in the case of the second stage 102, equal to 800 W, with a $C_2F_6$ flow rate equal to 200 sccm, an $O_2$ flow rate equal to 215 sccm and an argon flow rate equal to 5000 sccm, 80% of the $C_2F_6$ and of the $CF_4$ generated is destroyed, thereby enabling the targets imposed by the recommendations or regulations in force or currently in preparation to be achieved.

It should be noted that the description of a treatment example with reference to FIGS. 4 to 7 relates to the treatment of $SF_6$ and of $C_2F_6$, but, of course, the treatment process described above also applies to any type of perfluorinated or hydrofluorocarbon gas, as well as to any other type of halogenated gas, for example chlorofluorocarbons.

Moreover, in the description of the apparatus given above, the plasma is created using a surfatron-guide. As a variant, it is also possible to provide the apparatus with other devices for the creation of a high-frequency plasma, for example a surfaguide or an "Ro-Box" with regard to surface waves, or a resonant-cavity device, of known type.

We claim:

1. A process for treating s perfluorinated-containing gas, a hydrofluorocarbon-containing gas or a combination thereof, comprising the steps of:

creating an atmospheric-pressure plasma in at least one hollow dielectric tube;

making said gas to be treated flow through said at least one dielectric tube in contact with said plasma for the purpose of dissociating molecules of said gas into reactive compounds; and reacting said reactive compounds with a corresponding reactive element for the purpose of destroying them.

2. The treatment process as claimed in claim 1, wherein the step of creating the plasma further comprises flowing a carrier gas flow through said dielectric tube and exciting and ionizing said carrier gas using an electric field of a traveling electromagnetic surface wave moving through said carrier gas and through said dielectric tube to create a column of plasma which is not in local thermodynamic equilibrium.

3. The treatment process as claimed in claim 2, further comprising the step of producing the surface wave with a surfatron-guide surface-wave exciter.

4. The treatment process as claimed in claim 2, wherein said carrier gas is argon.

5. The treatment process as claimed in claim 1, wherein the perfluorinated gas is $CF_4$, $C_2F_6$, $C_3F_8$, $SF_6$ or $NF_3$ and wherein the hydrofluorocarbon gas is $CHF_3$, $CH_2F_2$, $C_2HF_5$ or $C_2H_2F_4$.

6. The treatment process as claimed in claim 1, further comprising the step of mixing the gas to be treated with at least one assistant gas, prior to said step of making said gas flow through said at least one dielectric tube.

7. The treatment process as claimed in claim 6, wherein the assistant gas is oxygen.

8. The treatment process as claimed in claim 1, wherein said reactive element is soda lime, water or an alkaline aqueous solution.

9. The treatment process as claimed in claim 8, wherein said reactive element is soda lime.

10. The treatment process as claimed in claim 1 wherein said reactive compounds are fluorinated compounds.

11. The treatment process as claimed in claim 1, wherein said dielectric tube is downstream of an integrated-circuit fabrication plant.

12. A plasma treatment process, comprising introducing a gas comprising a perfluorinated gas, a hydrofluorocarbon gas or a combination thereof, into a plasma treatment apparatus, forming an atmospheric pressure plasma from said gas, wherein molecules of said perfluorinated gas, said hydrofluorocarbon gas or said combination thereof are dissociated into reactive compounds, removing from the plasma treatment apparatus an effluent gas comprising said reactive compounds and reacting said reactive compounds with a corresponding reactive element for the purpose of destroying them.

13. The treatment process as claimed in claim 12, wherein the gas further comprises a carrier gas.

14. The treatment process as claimed in claim 13, wherein the carrier gas is argon.

15. The treatment process as claimed in claim 13, wherein a column of said plasma is generated by an electric field of a traveling electromagnetic surface wave, and said plasma is not in local thermodynamic equilibrium.

16. The treatment process as claimed in claim 15, wherein said surface wave is generated by a surfatron-guide surface-wave exciter.

17. The treatment process as claimed in claim 16, wherein said surface-wave exciter comprises a cylindrical sleeve made of conductive material, inside which is mounted a corresponding dielectric tube, and a region for concentrating incident waves in a space lying between an internal wall of said exciter and a free end of said sleeve for creating therein an electric field coaxial with said dielectric tube.

18. The treatment process as claimed in claim 17, wherein said sleeve further comprises an inner cylinder in which said dielectric tube is mounted, and an outer cylinder which, with said inner cylinder, delimits a cooling chamber, said process further comprising supplying a liquid coolant to said cooling chamber.

19. The treatment process as claimed in claim 17, wherein said sleeve and said dielectric tube are separated by a cylindrical space, and said process further comprises supplying said space with a gaseous coolant.

20. The treatment process as claimed in claim 12, wherein the gas comprises a perfluorinated gas selected from the group consisting essentially of $CF_4$, $C_2F_6$, $C_3F_8$, $SF_6$ and $NF_3$.

21. The treatment process as claimed in claim 12, wherein the gas comprises a hydrofluorocarbon gas selected from the group consisting essentially of $CHF_3$, $CH_2F_2$, $C_2HF_5$ and $C_2H_2F_4$.

22. The treatment process as claimed in claim 12, wherein said gas further comprises at least one assistant gas.

23. The treatment process as claimed in claim 22, wherein the assistant gas is oxygen.

24. The treatment process as claimed in claim 12, wherein said reactive element is soda lime, water or an alkaline aqueous solution.

25. The treatment process as claimed in claim 24, wherein said reactive element is soda lime.

26. The treatment process as claimed in claim 12, wherein said plasma treatment apparatus is downstream of an integrated-circuit fabrication plant.

* * * * *